March 12, 1968    W. J. ROZMUS    3,372,480
CAM ACTUATED PIVOTED JAW TOOL
Filed June 15, 1966    2 Sheets-Sheet 2
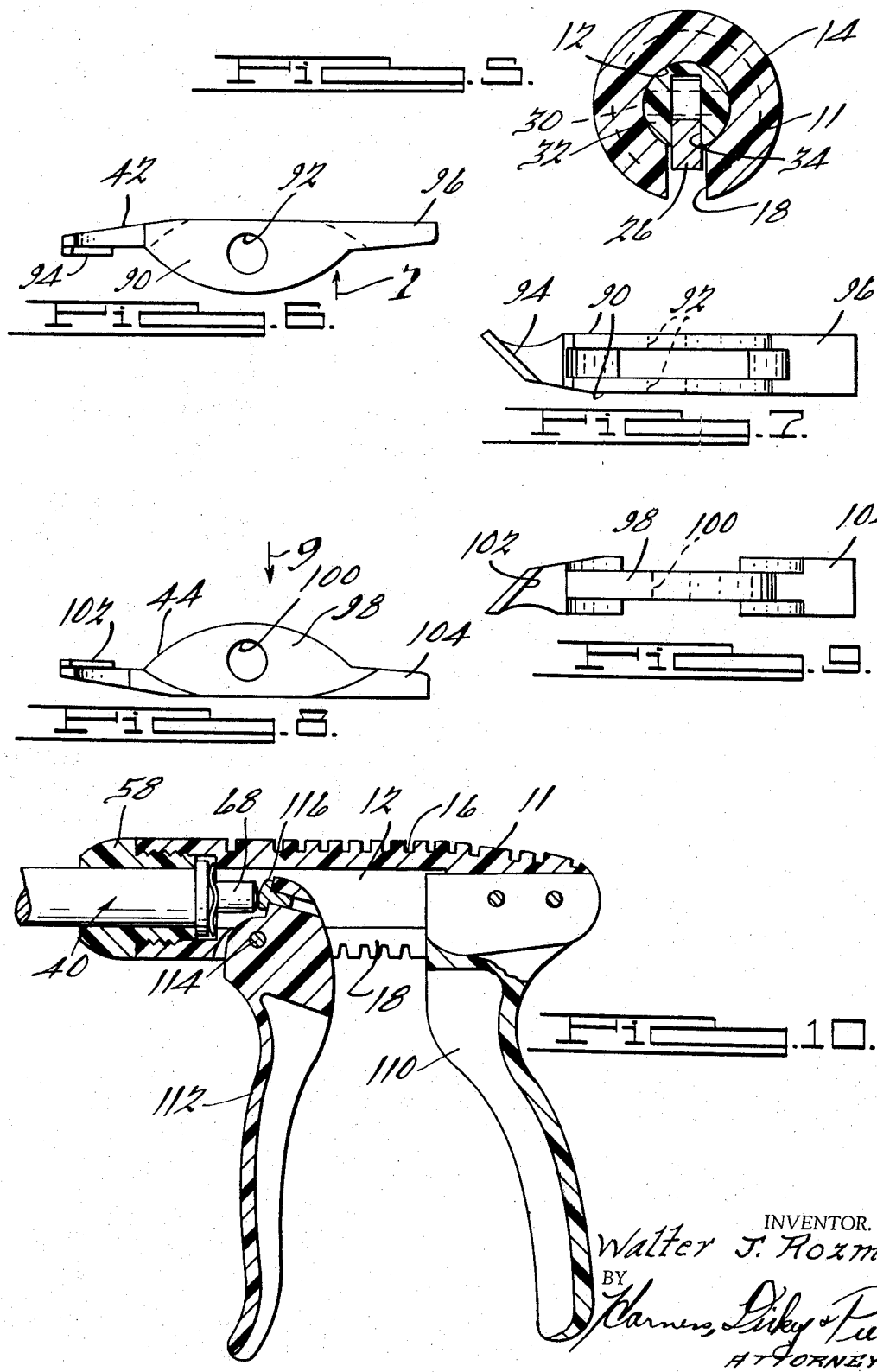
INVENTOR.
Walter J. Rozmus
BY
Harness, Dickey & Pierce
ATTORNEYS.

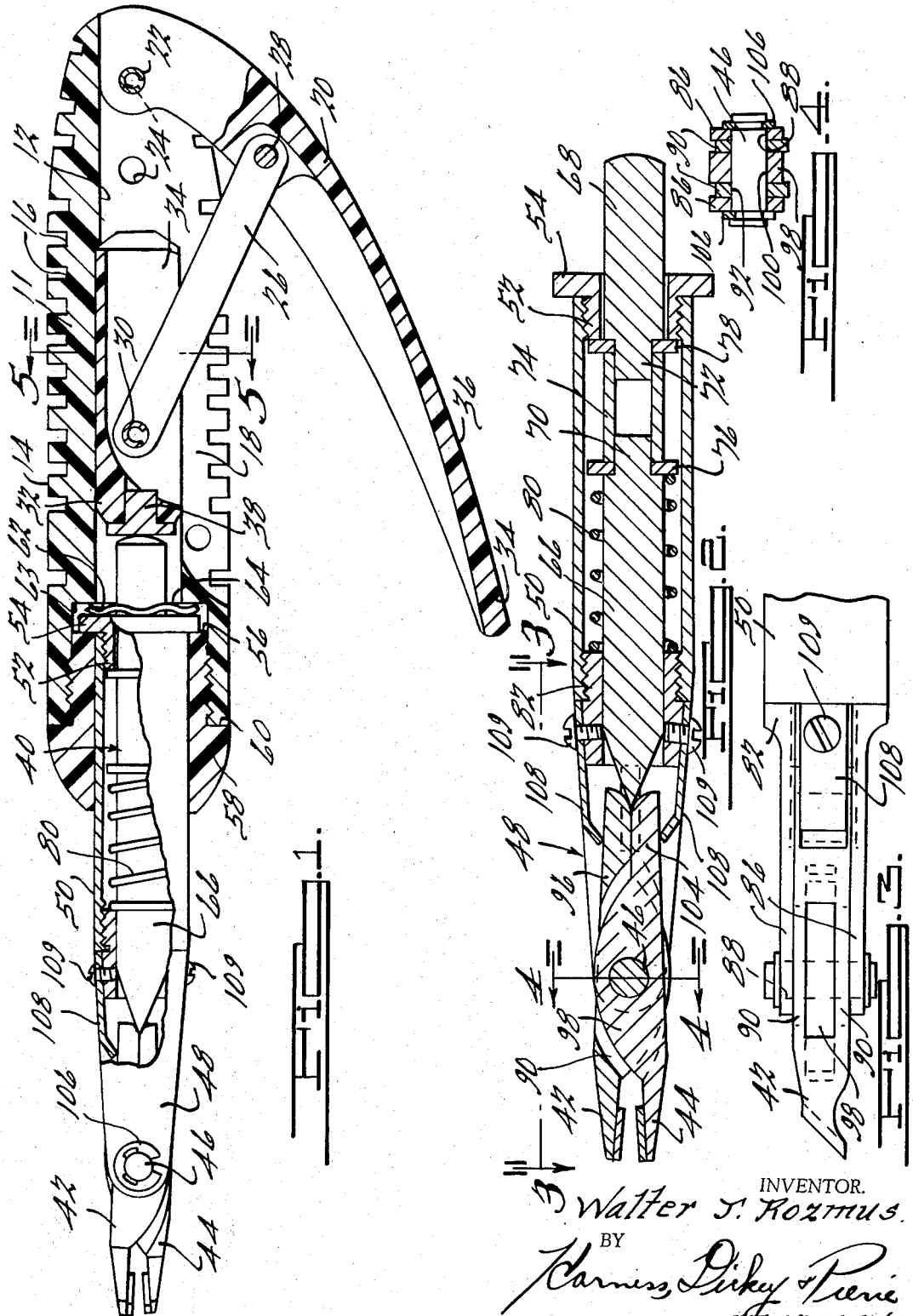

United States Patent Office 3,372,480
Patented Mar. 12, 1968

3,372,480
CAM ACTUATED PIVOTED JAW TOOL
Walter J. Rozmus, Hubbardsville, N.Y., assignor to Kelsey-Hayes Company, Romulus, Mich., a corporation of Delaware
Filed June 15, 1966, Ser. No. 557,686
13 Claims. (Cl. 30—193)

ABSTRACT OF THE DISCLOSURE

A pivoting jaw tool which is especially suited for use as a wire nipper. The jaws are formed separately from the remaining portion of the tool and are fitted together in such a manner as to insure their proper alignment. Accordingly, the jaws may be installed on the tool by a removable pivot pin without having to carefully fit them to the tool. The jaws are wedge-actuated and the actuating wedge, together with the jaws and the jaw holder, form a separable subassembly which can be readily interchanged on the tool. The wedge is actuated through operation of a handle pivoted to the tool body.

---

This invention relates to tools, and particularly hand tools having a pair of pivoted work-engaging jaws.

It is an object of the present invention to provide a pivoted jaw tool in which the jaws are interfitted in a manner establishing the relative position along the pivot axis irrespective of the location of the head or jaw-engaging shoulders of the bolt, nut, rivet, pivot pin or other fastener used to hold the jaws in assembly.

It is another object of the present invention to provide a pivoted jaw tool in which the jaws are formed separately from the handle or actuating portion of the tool to permit the machining and heat treating of the jaws separately from the rest of the tool and to permit the jaws to be made from a different material than the remaining portion of the tool.

It is still another object of the present invention to provide a tool of the above character in which the jaws are extremely rigidly positioned, are closely and accurately located with respect to one another, are ruggedly made, and are fully supported against deflection by extensive bearing areas contacting one another.

It is another object of the present invention to provide a tool of the above character in which the pivot axis of the jaws may be adjusted and in which the jaws are readily accessible to remote locations which are too small to be reached by hand.

It is another object of the present invention to provide a pivoted jaw tool possessing a high degree of versatility and interchangeability of its component parts, in which jaws of the same or different types may be readily substituted in the tool and in which the position of the jaws with respect to the hand held part of the tool can be readily changed by the substitution of a minimum number of parts.

It is still a further object of the present invention to provide a tool of the above character which is particularly suited for use as a cutter for nipping wire in the electronics industry, and wherein the cutting edges may be ground in fixtures prior to the assembly of the jaws to the remaining portion of the tool so that upon the subsequent assembly of the jaws with the rest of the tool the alignment of the cutting edges remains exact.

It is another object of the present invention to provide a tool of the above character which eliminates the need for heat treating the parts after assembly or subjecting parts of the tool to hammering or other physical abuse in order to loosen the pivot joint and place the assembly in proper condition for utilization.

It is another object of the present invention to provide a pivoted jaw tool which possesses a high mechanical advantage, which is relatively inexpensive to manufacture, which is durable in construction and which is convenient to use for even unskilled workers, which is easily received and which is otherwise excellently suited for its intended purpose.

These and other objects of the present invention will become apparent from the following detailed description taken in conjunction with the accompanying drawings, wherein:

FIGURE 1 is a view partly in elevation and partly in longitudinal vertical section of a tool made in accordance with the present invention;

FIGURE 2 is a view in full section of a part of the structure shown in FIG. 1;

FIG. 3 is a view of a part of the structure illustrated in FIG. 2, looking in the direction of the arrows 3—3 of FIG. 2;

FIG. 4 is a sectional view of the structure illustrated in FIG. 2 taken along the line 4—4 thereof;

FIG. 5 is a sectional view of the structure illustrated in FIG. 1 taken along the line 5—5 thereof;

FIGS. 6 and 7 are plan and side elevational views of one of the jaws illustrated in FIGS. 1 to 3;

FIGS. 8 and 9 are plan and side elevational views of the other one of the jaws illustrated in FIGS. 1 to 3, and FIG. 10 is a fragmentary sectional view of a tool illustrating a modified form of the prevent invention.

The invention is illustrated herein in the form of a cutting tool particularly suited for cutting wire, or the like. It is to be understood, however, that the invention is equally applicable to other movable jaw hand tools which are intended for gripping, twisting, bending, punching or other work performing functions.

Referring now to the drawings, and particularly to FIG. 1, the tool is shown as having a housing or supporting body 11 of elongated generally tubular form. The housing 11 has a longitudinally extending central bore 12 which extends completely between the opposite ends and is of stepped diameter. The outer periphery 14 of the housing 11 is formed with a plurality of longitudinally spaced annular grooves 16 which merely make the tool easier to grip and reduce the tendency of the hand to perspire on the tool when it is used over an extended period of time. The housing 11 has a longitudinally extending slot 18 formed in the bottom thereof and providing an opening between the bore 12 and the outer periphery 14. A handle 20 has one end thereof pivotally connected to the rear end of the housing 11 by a pivot pin 22. The pivot pin 22 extends across the bore 12 and is fitted in one of a pair of holes 24 drilled across the housing 11. The handle 20 serves to operate a link 26, which is pivotally connected to the handle 20 at one end thereof by a pivot pin 28 positioned relatively closely to the pivot pin 22. The handle 20 and link 26 define a toggle mechanism which is adapted to be hand-operated for effecting operation of the tool.

The end of the link 26 opposite from the pivot pin 28 is pivotally connected by a pivot pin 30 to a generally cylindrical plunger 32 which is smoothly slidable within the bore 12. The plunger 32 has a slot 34 formed in one side thereof in alignment with the housing slot 18 to accommodate the link 26. The pivot pin 30 will be seen to lie forwardly of the pivot pin 28 and the pivot pin 28 lies below and between the pivot pins 30 and 22. Accordingly, when the handle 20 is moved toward the housing 11 by the application of a force adjacent its free end, the plunger 32 will be moved along the bore 12 with a substantial mechanical advantage. The tool of FIG. 1 is preferably held with the housing 11 in the palm of the hand, with the ends of the fingers wrapped around the outer surface 36 of the handle 20, and with the forward end of the tool pointed generally toward the user.

The plunger 32 carries a hardened abutment member 38 at its forward end which is abuttable with the rear end of a wedge assembly 40. The wedges assembly 40 is rectilinearly shiftable along the longitudinal axis of the tool (e.g., the axis of the bore 12) to open and close a pair of jaws 42 and 44. The jaws 42 and 44 are both pivoted on a single pivot pin 46 which is carried by a jaw holder 48 having generally the shape of a clevis. The jaw holder 48 is disposed at the forward end of a housing extension tube 50 projecting forwardly from the housing 11. An externally threaded retainer member 52 is threaded into the rear end of the tube 50. The retainer member 52 has an annular flange 54 which projects radially outwardly of the outer periphery of the tube 50 for abutment by an end wall 56 of an externally threaded retainer nut 58. The nut is threaded into the forward end of the bore 12 and has an annular shoulder 60 engageable with the forward end of the housing 11. The outer periphery of the nut 58 forms a smooth continuation of the outer periphery 14 of the housing 11. The side of the flange 54 opposite from the nut 58 engages a spring wave washer 62 which, in turn, is held against an annular shoulder 63 formed in the bore 12. The wedge assembly 40 passes through the wave washer 62, the retainer member 52, the nut 58, and the tube 50. When the nut 58 is tightened against the forward end of the housing 11 the wave washer 62 is held under compression and the tube 50 is normally kept from rotating or otherwise moving with respect to the housing 11. However, the tube 50 may be gripped and forcibly rotated to adjust the pivot axis of the jaws 42 and 44. The wave washer 62 yields to facilitate such adjustment.

The detailed parts of the wedge assembly 40 are best illustrated in FIG. 2 from which it will be seen that said assembly includes a wedge member 66, and an extension rod 68. The wedge member 66 has a reduced diameter rear terminal portion 70 and the extension rod 68 has a reduced diameter forward terminal portion 72. Said reduced diameter portions 70 and 72 are press fitted within the opposite ends of a sleeve or tube 74. A pair of washers 76 and 78 are positioned on the wedge member 66 and extension rod 68, respectively, and are held thereon by their abutment with the opposite ends of the tube 74. A coil spring 80 is positioned on the wedge member 66 and is held under compression between the washer 76 and the rear end of an externally threaded portion 82 of the jaw holder 48. It will be noted that the jaw holder portion 82 is threaded into the forward end of the tube 50. By this means a rearward force is applied to the wedge member 66 so that the spring 80 serves a wedge retracting function. The degree of retraction is limited by the abutment of the washer 78 with the forward end of the retainer member 52. It will be seen that a jaw operating force is applied to the rear end of the extension rod 68 by the abutment member 38 carried by the plunger 32. This force is, of course, exerted axially of the wedge assembly 40.

The detailed shape of the jaws 42 and 44 and the jaw holder 48 are best seen in FIGURES 4 and 6 to 9. It will be seen that the jaw holder 48 has a pair of parallel generally flat laterally spaced walls 86 which are disposed parallel to the longitudinal axis of the tool and project forwardly from the threaded portion 82 thereof. The walls 86 have aligned holes 88 for the reception of the pivot pin 46 and are spaced apart a distance just great enough to receive the jaw 42 therebetween for smooth operating pivotal movement. It will be noted that there is a distinct difference between the jaws 42 and 44, the jaw 42 being identifiable as a female jaw and the jaw 44 being identifiable as the male jaw.

The female jaw 42 has a pair of parallel laterally spaced walls 90 having aligned pivot pin receiving openings 92 formed generally centrally therein. The walls 90 possess substantially greater dimension in a direction parallel to the longitudinal axis of the tool than they do in a direction laterally of such axis. The portion of the jaw 42 disposed forwardly of the walls 90 will be seen to have a work engaging surface in the form of a single cutting edge 94 and the portion of the jaw 42 rearwardly of the walls 90 defines a wedge-engaging cam portion 96.

The male jaw 44 will be seen to have a single central wall 98 provided with a central pivot pin receiving opening 100. The portion of the jaw 44 which is disposed forwardly of the wall 98 has a work engaging surface in the form of a single cutting edge 102 and the portion of jaw 44 disposed rearwardly of the wall 98 defines a cam portion 104. The cam portions 96 and 104 are engageable by the wedge member 66 for actuation of the jaws.

The wall 98 of the male jaw will be seen to possess a lateral thickness enabling it to fit snugly but slidably between the walls 90 of the female jaw 42. When the wall 98 is fitted between the walls 90 and the pivot pin 46 is inserted in the openings 92 and 100, the cutting edges 94 and 102 will align with one another, and the cam portions 96 and 104 will be in oppositely facing relation for insertion of the end of the wedge member 66 therebetween. It will be noted that the cam portion 96 and the cutting edge 94 lie on the same side of a given midplane including the longitudinal axis of the tool, while the cam portion 104 and the cutting edge 102 lie on the opposite side of such midplane. Thus, when the cam portions 96 and 104 are forced apart by wedge member 66, the cutting edges 94 and 102 are moved together. It will be seen that the pivot pin 46 is properly held within the holes 92 and 100 of the jaws 42 and 44 and within the holes 88 and the jaw holder 48 by means of a pair of spring retaining rings 106 which are snap fitted in appropriately machined grooves in the outer periphery of the pivot pin 46. Because of the extensive axially extending bearing area between the jaws 42 and 44 it will be seen that there is little chance for inclination or deflection of one of said jaws with respect to the other. This results from the substantially close fit of the wall 98 between the integrally formed walls 90.

The normal relative position of the jaws 42 and 44 is with the cutting edges 94 and 102 spaced apart. This position results from the use of a pair of leaf springs 108 which bias the cam portions 96 and 104 of the jaws toward one another. The springs 108 are held to the jaw holder 48 by screws 109 threaded into the jaw holder portion 82.

It should be emphasized that the jaws 42 and 44 are each machined from a single piece of material which is preferably harder and longer wearing material than what is used for the rest of the tool. The jaws 42 and 44 are also machined to much closer tolerances than the remaining portions of the tool. The precise separate finishing of the jaws 42 and 44 from hard material, such as high speed tool steel, is easily accomplished without having to use a similar, expensive hard material for the remainder of the tool. By way of example, the spacing between the walls 90 may be held to within $1/1000$ of an inch, and the pivot pin 46 held to a tolerance of $2/10,000$ of an inch by centerless grinding. By means of the foregoing, the proper fit and alignment of the cutting edges 94 and 102 may be held to within $2/10,000$ of an inch. In this connection it may be noted that one of the two surfaces which are ground to form the cutting edges 94 and 102 of each jaw may be ground prior to the assembly of such jaws on a pivot pin and the second of the surfaces ground to form the cutting edge may be ground with the two jaws 42 and 44 joined on a common pivot pin. By this means the absolute accurate alignment of the cutting edges 94 and 102 is assured. From the foregoing it will be apparent that the jaws 42 and 44 may be used over an extended period of time without appreciable misalignment between the cutting edges 94 and 102 thereof. or a variety of other relatively soft and easily workable materials without adversely affecting the quality of the cut produced by the jaws 42 and 44 and without adversely affecting the long useful life of said jaws. It will also be seen that the cutting edges 94 and 102 are relatively closely spaced from the pivot pin 46 compared to the point at which the manual actuating force is applied. By this means the mechanical advantage of the resistance offered by the work to the movement of the cutting edges, which is transmitted to the pivot pin, is considerably reduced compared to that encountered in conventional cutting pliers having their cutting edges spaced a long distance from the pivot location.

In reviewing the functions of the various parts of the tool it will be seen that the retainer member 52 and the portion 82 of jaw holder 48 function as guides for the wedge assembly 40. The tube 50 just forms a protective enclosure for the wedge assembly 40 and positions the jaw holder 48 at the desired distance from the housing 11. The tube 50 can be changed to lengthen or shorten it if desired and it is then only necessary to change the tube 74 to match the new tube 50. All the remaining parts of the wedge assembly 40 remain the same irrespective of the length of the tubes 50 and 74.

If the cutting edges 94 and 102 should become dull or if the jaws 42 and 44 should otherwise require servicing, the jaws can easily be removed from the tool and replaced with another pair of jaws. This is, of course, accomplished by removing one of the snap rings 106 and withdrawing the pivot pin 46 from the holes 88, 92 and 100. The jaws 42 and 44 can then be slid out from between the walls 86 of the jaw holder 48. On an assembly line the jaws 42 and 44 are the parts of the tool that are most likely to require servicing and the construction of the tool permits the quick substitution of a new pair of jaws for a pair in need of servicing with the tool being taken out of use practically no time at all.

Alternatively, the nut 58 can be unscrewed and slid off the tube 50 and jaw holder 48. For this purpose the nut 58 is provided with suitable slots (not shown) to clear the heads of the screws 109. The entire subassembly consisting of the tube 50, jaws 42 and 44, jaw holder 48, and wedge assembly 40, can then be replaced. Replacement assemblies having different types of jaws may be provided for a single tool. For example, a replacement subassembly having work gripping, rather than work cutting, jaws may be provided for alternative use with the same housing.

FIG. 10 shows a slightly modified version of the tool in which the handle 20, link 26, and plunger 32 are omitted. In lieu thereof, a stationary handle 110 is fixed to the housing adjacent the rear end thereof and an actuating handle or trigger 112 is pivoted to the housing 11 forwardly of the handle 110 by means of a pivot pin 114. The handle 112 extends through the slot 18 and carries a hardened abutment member 116 within the bore for engagement with the rear end of the rod 68 of the wedge assembly 40. The construction shown in FIG. 10 may be characterized as having a pistol grip type holder and actuating mechanism and is operated by manually squeezing the handle 112 toward the handle 110.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A pivoted jaw tool including a jaw holder having a pair of parallel spaced walls, a pivot pin supported between said jaw holder walls, a pair of jaws pivotally supported upon said pivot pin and formed separately from said jaw holder, one of said jaws having a pair of parallel laterally projecting wall portions spaced apart in the direction of the axis of said pivot pin, the other of said jaws having a laterally projecting wall portion closely but pivotally fitted between the wall portions of said one jaw, said wall portion having aligned openings receiving said pivot pin, said jaws having aligned cutting portions disposed forwardly of said pivot pin and cam portions disposed rearwardly of said pivot pin, a shiftable wedge engageable with said cam portions to pivot both of said jaws on said pivot pin and means for shifting said wedge, said jaws and said pivot pin forming a subassembly which is readily removable from and installable in said jaw holder and wherein the alignment of said cutting portions is maintained by the fit of the projecting wall portion of said other jaw between the wall portions of said one jaw.

2. The structure set forth in claim 1 wherein said walls are disposed perpendicular to said pivot axis and the wall of said other jaw is flatly engageable with said pair of walls of said one jaw.

3. The structure set forth in claim 1 in which the work-engaging and cam portions of said one jaw are disposed on one side of a plane which includes said pivot pin and extends longitudinally of the tool and the work-engaging and cam portions of said other jaw are disposed on the other side of said plane whereby movement of said cam portions away from one another will cause said work-engaging portions to move toward one another.

4. The structure set forth in claim 1 in which said pivot pin has removable abutment means at least one end thereof readily disengageable from said pivot pin to permit said pivot pin to be withdrawn from said openings and said jaws to be removed from said jaw holder.

5. The structure set forth in claim 1 in which said wall portions of said one jaw define therebetween a recess which extends transversely entirely through said jaw, said recess being closed by the work-engaging portion of said one jaw at the forward end of said wall portions thereof and said recess being closed by the cam portion of said one jaw at the rearward end of said wall portions thereof.

6. The structure set forth in claim 1 including first spring means biasing said jaw cam portions toward one another and second spring means biasing said wedge away from said jaws.

7. A pivoted jaw tool including a housing, a housing extension tube having a radially extending shoulder positioned at one end of said housing, a nut surrounding said tube and threadably engageable with said housing at one end thereof, said nut being engageable with said extension tube shoulder to locate said shoulder with respect to a shoulder formed on said housing, wedge means slidable in said extension tube having a wedge surface at the end thereof opposite from said housing and an abutment surface at the opposite end thereof, means carried by said tube for limiting movement of said wedge means toward said housing, a pair of jaws pivotally supported by said housing extension tube at the end thereof opposite said housing and engageable by said wedge surfaces for actuation thereof, and wedge actuating means supported on said housing and engageable with said abutment surface to move said wedge means between said jaws, said tube, said jaws and said wedge means forming a subassembly which is removable from the remaining portion of the tool upon the removal of said nut, whereby subassemblies of varying length and jaw configurations may be interchangeably used on said tool.

8. The structure set forth in claim 7 in which said nut can be slid off of said tube over said jaws to permit interchanging of a subassembly including said tube and a pair of jaws pivotally supported on said tube.

9. The structure set forth in claim 7 including a spring washer disposed between said housing extension tube shoulder and said housing shoulder, said spring washer being yieldable to permit angular adjustment of said housing extension tube with respect to said housing.

10. The structure set forth in claim 7 in which said wedge means having said wedge surfaces comprises a wedge member, an abutment member having said abutment surface and a sleeve removably connecting said wedge member and abutment member whereby said sleeve and said housing extension tube can be changed to position said jaws varying distance from said housing.

11. The structure set forth in claim 10 including a washer positioned between said sleeve and said wedge member and a spring positioned between said washer and said jaws for biasing said wedge away from said jaws.

12. The structure set forth in claim 7 including first spring means biasing said jaws to an open position and second spring means biasing said wedge away from said jaws.

13. A pivoted jaw hand tool including a housing having a bore formed therein and a slot extending laterally between said bore and the outer periphery of said housing, a pair of pivoted jaws carried by said housing, wedge means for operating said jaws, a plunger slidable in said bore and abuttable with said wedge means, a handle pivoted to said housing at one end thereof, a link extending through said slot and pivoted at its opposite ends to said handle and said plunger whereby pivotal movement of said handle toward said housing will advance said plunger in said bore to actuate said wedge.

References Cited
UNITED STATES PATENTS

| | | | |
|---|---|---|---|
| 2,032,415 | 3/1936 | Hirsch | 81—349 |
| 2,088,224 | 7/1937 | Aiken | 81—416 |
| 2,518,994 | 8/1950 | Miller | 81—116 |
| 2,981,133 | 4/1961 | Campman et al. | 81—349 |
| 3,058,214 | 10/1962 | Mekler | 81—301 X |
| 3,177,583 | 4/1965 | Fischer et al. | 81—301 X |
| Re. 25,842 | 8/1965 | Keane et al. | 81—301 X |

FOREIGN PATENTS 1,104,481  6/1955  France.

OTHELL M. SIMPSON, *Primary Examiner.*

WILLIAM FELDMAN, G. WEIDENFELD, *Examiners.*